United States Patent [19]

Lee

[11] Patent Number: 5,377,059
[45] Date of Patent: Dec. 27, 1994

[54] BI-DIRECTIONAL DUAL-DRAM MAGNETIC RECORD/REPRODUCING APPARATUS

[75] Inventor: Min-Su Lee, Suwon, Rep. of Korea

[73] Assignee: SamSung Electronics Co., Ltd., Suwon, Rep. of Korea

[21] Appl. No.: 935,393

[22] Filed: Aug. 26, 1992

[30] Foreign Application Priority Data

Aug. 31, 1991 [KR] Rep. of Korea .......... 91-15242

[51] Int. Cl.$^5$ .......... G11B 5/52; G11B 15/61; G11B 5/027
[52] U.S. Cl. .......... 360/84; 360/107
[58] Field of Search .......... 360/84, 85, 74.1, 74.4, 360/107, 130.24

[56] References Cited

U.S. PATENT DOCUMENTS

| | | | |
|---|---|---|---|
| 4,270,152 | 5/1981 | Ida | 360/74.4 |
| 4,279,006 | 7/1981 | Sasaki et al. | 360/90 |
| 4,369,473 | 1/1983 | Eibensteiner | 360/84 |
| 4,594,624 | 6/1986 | Kanchiku et al. | 360/85 |
| 4,646,302 | 2/1987 | Ono | 360/137 |
| 4,819,099 | 4/1989 | Saito | 360/84 |
| 4,843,485 | 6/1989 | Reitmeier | 360/9.1 |
| 4,930,024 | 5/1990 | Kanda et al. | 360/10.3 |
| 5,247,405 | 9/1993 | Mitani | 360/84 |

FOREIGN PATENT DOCUMENTS

| | | | |
|---|---|---|---|
| 41-2025 | 2/1966 | Japan | 360/130.24 |
| 58-200404 | 11/1983 | Japan | 360/130.23 |
| 62-92259 | 4/1987 | Japan | |
| 63-201953 | 8/1988 | Japan | 360/85 |
| 2-58703 | 2/1990 | Japan | |

Primary Examiner—A. J. Heinz
Assistant Examiner—Kevin M. Watkins
Attorney, Agent, or Firm—Robert E. Bushnell

[57] ABSTRACT

A magnetic recording/reproducing apparatus (VTR, Camcorder, DAT and the like) which can record and reproduce image signals and audio signals on a magnetic tape. The magnetic recording/reproducing apparatus is equipped with two magnetic head drums having mutually-opposing set-up angles and rotating directions, with one head drum for recording signals or reproducing the recorded signals on the upper domain of a tape when the tape is played in a first direction and with another head drum for recording signals or reproducing the recorded signals on the lower domain of a tape when the tape is played in an opposite direction. The magnetic recording/reproducing apparatus can record or reproduce in both directions, eliminating the drawback of compulsory rewinding after reproduction, and thus enabling long duration of recording and reproduction by doubling the usage time of the tape.

28 Claims, 2 Drawing Sheets

BI-DIRECTIONAL DUAL-DRUM MAGNETIC RECORD/REPRODUCING APPARATUS

BACKGROUND OF THE INVENTION

1. Field of the Invention

The present invention relates to a magnetic recording/reproducing apparatus such as a VTR(Video Tape Recorder), Camcorder or DAT(Digital Audio Taperecorder), which records and reproduces image and audio signals on magnetic tapes and more particularly to a magnetic recording/reproducing apparatus wherein there are two magnetic head drums, having mutually contradictory set-up angles and rotating directions with one head drum used for recording or reproducing the signals on an upper domain of a tape when played in the right direction, and the other head drum used for recording or reproducing the signals on the lower domain of the tape during the play of the tape in the opposite direction.

2. Description of the Prior Art

Generally, the magnetic recording/reproducing apparatus such as the VTR, Camcorder, DAT and the like has a construction for recording and thereafter reproducing the signals on one full side of a tape.

In other words, the magnetic recording/reproducing apparatus has a construction wherein the tape is played in one direction and signals are recorded and reproduced on one whole side on a tilt.

Contrary to this kind of conventional technique, Japanese laid open Patent Application No. Sho 61(1986)-199214 published on Sep. 3, 1986, entitled "Magnetic Record Reproducing Apparatus" discloses a recording/reproducing technique of dividing the domain of a tape into an upper and a lower area for separation of a luminance signal and a chrominance signal.

According to said magnetic recording/reproducing apparatus, one magnetic head for the luminance signal and another magnetic head for the chrominance signal are installed in layers on the on the upper drum of one rotating magnetic head drum so that the luminance signal and the chrominance signal can be separately recorded and reproduced in the upper and lower domains of the tape.

Japanese laid open Patent Application No. Sho 61-242362, entitled "Rotating Magnetic Head Apparatus" filed on April 19, Sho 60(1985) by the same applicant and published on Oct. 28, 1986, and Japanese laid open Patent Application Nos. Sho 62-154214, entitled "Magnetic Record Reproducing Apparatus" and Sho 62-154215, entitled "Tape Guide Cylinder" filed on December, 26 Sho 60(1985) by Matsushida Electric Co., and published on Jul. 9, 1987 disclose techniques wherein a tape is divided into two areas, upper and lower sections, so that the luminance and chrominance signals can be separated for recording and reproducing.

Specifically, said techniques introduced a gist of techniques calling for set-up of heads on head drums.

However, all of these kinds of technical constructions have been made to record or reproduce when the tape is played in one direction, which has made it inevitable to re-wind the tape for reproduction once a reproduction is made.

Furthermore, as the recording or reproduction can be done only when a tape is played in one direction, a VHS 120-minute tape can record or reproduce 120 minutes worth of data, while a 160-minute tape can record or reproduce 160 minutes only.

However, the 120-minute tape may be used for recording or reproducing in a double mode, so that 240-minute recording or reproduction is available, and the 160-minute tape in triple mode enables 480-minute recording or reproduction.

In this manner, the conventional technical construction has a problem of re-winding the tape for repeated reproduction.

The conventional technical construction, still further, has a drawback of low utility efficiency of tape due to recording or reproduction performed on a whole width of a tape and only in one direction.

SUMMARY OF THE INVENTION

Accordingly, it is an object of the present invention to provide conveniences to a magnetic recording/reproducing apparatus wherein, by equipping the magnetic recording/reproducing apparatus with 2 head drums, one head drum performs the recording or reproduction when a tape is played in the right direction while the other head drum performs recording or reproduction when the tape is played in the opposite direction, thus resulting in elimination of a separate rewinding process.

It is a second object of the present invention to double the utility (time) efficiency of a tape by providing recording and reproduction capabilities at the same time when the tape is either played in the right direction or in the opposite direction.

In order to obtain said objects, the magnetic recording/reproducing apparatus in accordance with the present invention is provided with a first head drum which records or reproduces signals when the tape is played in the right direction and a second head drum which records or reproduces signals when the tape is played in the opposite direction.

In addition, in accordance with another aspect of the present invention there is provided a magnetic recording/reproducing apparatus, the apparatus comprising:

a second capstan motor for rotating a second capstan axis by driving during the tape playing in the right direction;

a second idler for rotating a second reel disk by receiving the driving force of said second capstan motor through a belt and driving gear;

a second pinch roller for playing the tape in the right direction by being sticked to said second capstan axis;

a first head drum for reproducing the recorded signals or for recording signals on the tape during the tape playing in the right direction;

a first capstan motor for rotating a first capstan axis by driving during the tape playing in the opposite direction;

a first idler for rotating a first reel disk by receiving the driving force of said first capstan motor through a belt and driving gear;

a first pinch roller for playing the tape in the right direction by being adhered closely to said first capstan axis; and a second head drum for reproducing the recorded signals or recording signals on tapes during the tape playing in the opposite direction.

BRIEF DESCRIPTION OF THE DRAWINGS

For a fuller understanding of the nature and objects of the present invention, reference should be made to the following detailed description taken in conjunction with the accompanying drawings in which.

DETAILED DESCRIPTION OF THE INVENTION

Figure 1:
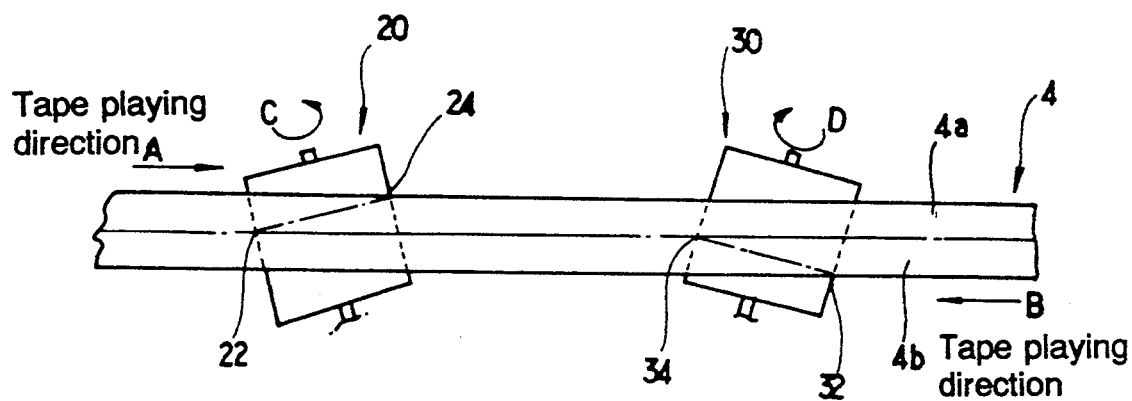
FIG. 1 is a side view of the major parts for a magnetic recording/reproducing apparatus in accordance with the present invention.

FIG. 1 is a side view for showing the relationship between a head drum of the magnetic recording/reproducing apparatus and the magnetic tape in accordance with the present invention.

According to FIG. 1, the first head drum 20 records signals or reproduces recorded signals while the tape 4 moves in the right direction A.

In other words, if the tape is played in the A direction, the first head drum 20, obliquely mounted with a predetermined angle rotates in a C direction, and accordingly the heads 22, 24 mounted on the first head drum 20 are played at an angle, causing the upper domain 4a of a tape 4 to record or reproduce signals.

The second head drum 30 records or reproduces signals when the tape 4 is played in the opposite direction, B.

Namely, when the tape 4 is played in the B direction, the second head drum 30, mounted obliquely with a predetermined angle in the opposite direction of first head drum 20, rotates in the D direction, and therefore the heads 32, 34 mounted on the second head drum 30 are played at a slanted angle such that signals are recorded or reproduced on lower domain 4b of the tape 4.

Figure 2:
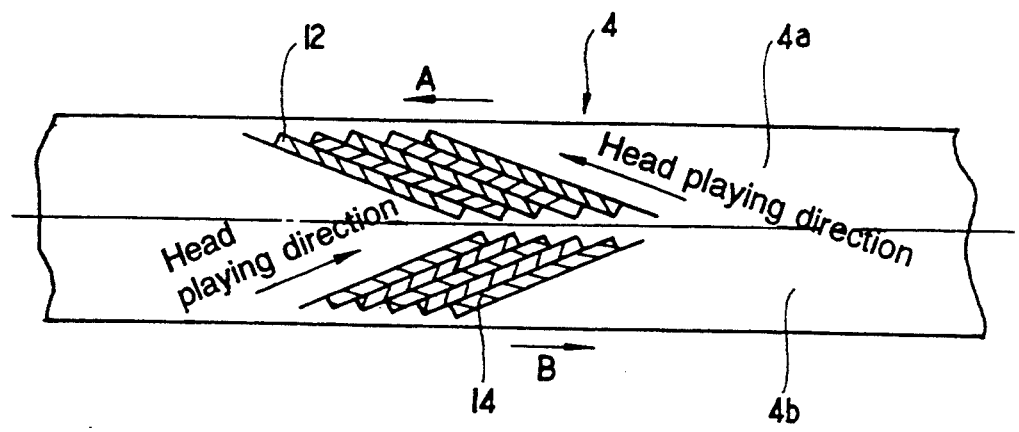
FIG. 2 is a constitutional diagram of signal recording for magnetic tapes in accordance with the present invention.

Meanwhile, FIG. 2 is a schematic drawing for illustrating the conditions about how signals are recorded on the tape in the magnetic recording/reproducing apparatus as shown in FIG. 1 in accordance with the present invention.

The tracks 12, 14, formed on upper and lower domains 4a, 4b of a tape 4 by the obliquely mounted first and second head drums 20, 30, respectively, (see FIG. 1) are slanted in mutually opposite directions. In other words, when the tape 4 is played in the A direction, a track 12 is formed on the upper domain 4a of a tape by the head of a first head drum, and when the tape 4 is played in the B direction, a track 14, slanted in the opposite direction from said track 12, is formed on the lower domain 4B of the tape by the head of the second head drum.

In this manner, the first & second head drums record respective signals or reproduce recorded signals on the upper and lower domains of a tape 4.

Figure 3A:
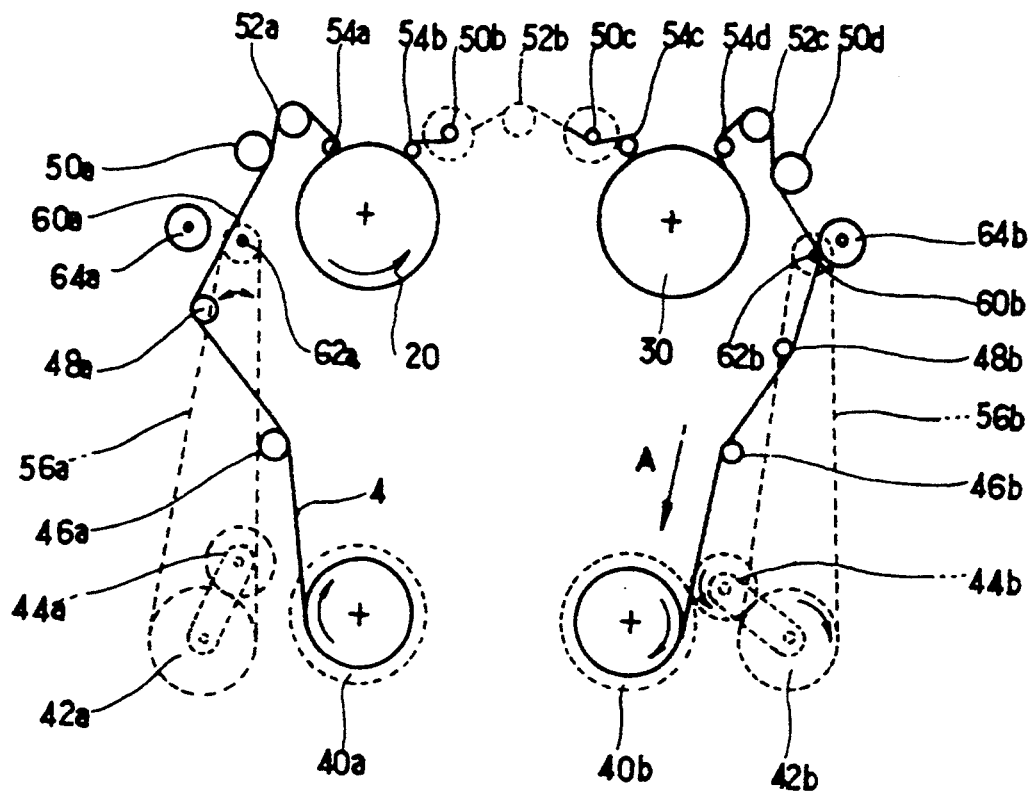
FIGS. 3A and 3B are schematic drawings of tape playing procedures for recording/reproducing signals on magnetic tapes in accordance with the present invention.
Figure 3B:
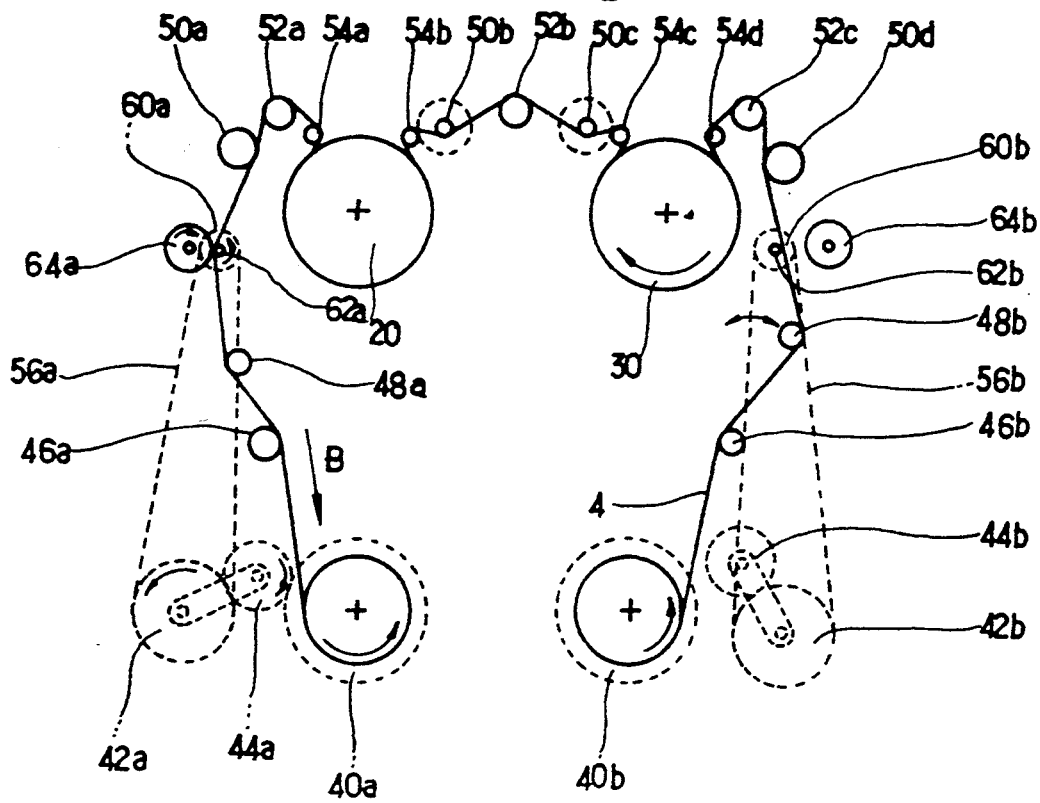

FIGS. 3A and 3B are schematic drawings for showing operational conditions wherein signals are recorded or reproduced on a tape in the magnetic recording/reproducing apparatus in accordance with the present invention.

FIG. 3A is a constitutional diagram of operation when the tape is played in a right direction while FIG. 3B is a constitutional diagram of operation when the tape is played in the opposite direction.

First of all, with reference to FIG. 3A, the operational condition is set forth below when a tape is played in the right direction.

In FIG. 3A, the tape 4 is wound around the first and second reel disks 40a, 40b, being closely adhered to the first and second head drums 20, 30, by the second, third and fourth rollers 52a, 52b, 52c and the first & second slant poles 54a, 54b, and the third & fourth slant poles 54c, 54d.

At this moment, the first & second tension poles 48a, 48b, in accordance with the driving modes (fast winding, rewinding, reproduction, etc) of magnetic record reproducing apparatus adjust the tension of the tape wound on said first & second head drums 20, 30.

In this manner, under the condition the tape is loaded, the second capstan motor 60b rotates the second capstan axis 62b and at the same time, rotates the second driving gear 42b by virtue of the second belt 56b.

The second driving gear 42b rotates the second idler 44b and simultaneously moves the second idler 44b to the left.

The second idler 44b is moved to the left and transmits the turning effect of the second driving gear to the second reel disk 40b.

Then, the second reel disk 40b is rotated and winds up the tape 4 while the second pinch roller 64b on the side of second reel disk 40b which winds up the tape is closely adhered to second capstan axis 62b and plays the tape 4 in the A direction.

As depicted in the foregoing, when the tape 4 is played in A the direction, the first head drum 20 is rotated in the C direction and signals are recorded or recorded signals are reproduced on upper domain 4a (refer to FIG. 1 or FIG. 2) of the tape 4.

At this point, the second head drum 30 is not separately driven (rotated), so that the friction force between the not-driven second head drum 30 and the tape 4 can be disregarded.

Meanwhile, the operational status while the tape plays in the opposite direction is explained below with reference to FIG. 3B.

When the tape 4, as explained in the above, is in a loaded condition, the first capstan motor 60a rotates the first capstan axis 62a and at the same time, rotates the first driving gear 42a by dint of the first belt 56a.

The first driving gear 42a rotates the first idler 44a and simultaneously moves the first idler to the right.

The first idler 44a is moved to the right and transmits the turning effect of the first driving gear 42a to the first reel disk 40a.

Then, the first reel disk 40a is rotated and winds up the tape 4 while the first pinch roller 64a on the side of the first reel disk 40a which winds up the tape 4 is closely adhered to the first capstan axis 62a and drives the tape 4 in the B direction.

At this point, the second head drum 30 rotates toward in the D direction and either records signals on the lower domain 4b (refer to FIG. 1 or FIG. 2) of the tape 4 or reproduces recorded signals from the lower domain.

In this location, previously unexplained codes 50a, 50b, 50c and 50d are impedance rollers and 46a, 46b are guide rollers.

In this manner, the magnetic record reproducing apparatus in accordance with the present invention can record or reproduce in both directions, needs no rewinding and doubles the usage time of a tape, resulting in utility effects where long times of recording and reproducing are needed.

It should be understood that the invention is not necessarily limited to the above-described examples. In practice, many variations are possible to those skilled in the art without departing from the scope of the invention.

Specifically, in the foregoing, signals are recorded and reproduced on the upper domain of a tape by the head mounted on the first head drum, and on the lower domain of a tape by the head mounted on the second head drum, however, it is also possible that by changing the positions of the heads, signals can be recorded and reproduced on the lower domain of a tape by the head mounted on the first head drum, and on the upper domain of a tape by the head of the second head drum.

What is claimed is:

1. A magnetic recording/reproducing apparatus, comprising:
    a first head drum for recording and reproducing information on a first set of consecutively arranged helical scan tracks corresponding to information signals on an upper domain of a first side of a tape while the tape is running in a first direction; and
    a second head drum for recording and reproducing information on a second set of consecutively arranged helical scan tracks corresponding to said information signals on a lower domain of said first side of the tape while the tape is running in a second direction opposite said first direction.

2. The magnetic recording/reproducing apparatus as defined in claim 1, wherein said first and second head drums are mounted in mutually opposing directions.

3. The apparatus as claimed in claim 1, further comprising:
    a first capstan driven by a first capstan motor and in contact with the tape, for moving the tape in said second direction;
    a first pinch roller for moving in contact with the tape during a second mode of operation to induce the tape to move in said second direction, and for moving away from the tape during a first mode of operation when the tape moves in said first direction;
    first driving gear means rotated by said first capstan motor in a first and a second rotational direction in respective dependence upon said first and second modes of operation, for engaging a first reel disk during said second mode of operation and for disengaging said first reel disk during said first mode of operation;
    a second capstan driven by a second capstan motor and in contact with the tape, for moving the tape in said first direction;
    a second pinch roller for moving in contact with the tape during said first mode of operation to induce the tape to move in said first direction, and for moving away from the tape during said second mode of operation when the tape moves in said second direction;
    second driving gear means rotated by said second capstan motor in said first and said second rotational directions in respective dependence upon said first and second modes of operation, for engaging a second reel disk during said first mode of operation and disengaging said second reel disk during said second mode of operation; and
    a plurality of guide rollers for providing a path for the tape as the tape travels to one of said first and second reel disks.

4. A magnetic recording/reproducing apparatus, comprising:
    a first capstan motor for rotating a first capstan axis when a tape is played in a second direction;
    a first idler for rotating a first reel disk by receiving a driving force of said first capstan motor by way of a first belt and a first driving gear;
    a first pinch roller for playing a tape in said second direction, said first pinch roller being closely adhered to said first capstan axis;
    a first head drum for reproducing recorded signals and for recording signals on a first side of a tape when the tape is run in a first direction;
    a second capstan motor for rotating a second capstan axis when the tape is played in said first direction opposite to said second direction;
    a second idler for rotating a second reel disk by receiving the driving force of said second capstan motor via a second belt and a second driving gear;
    a second pinch roller for playing the tape in said first direction, said second pinch roller being closely adhered to said second capstan axis; and
    a second head drum for recording signals on and for reproducing the recorded signals on said first side of the tape when the tape is played in said second direction.

5. A magnetic recording/reproducing apparatus for recording and reproducing information signals on a tape, comprising:
    a first head drum having a first pair of heads for recording and reproducing said information signals on a first set of consecutively scanned helical scan tracks on a top portion of a first side of the tape, said first set of helical scan tracks being arranged at a first predetermined angle to a first direction of travel of the tape when the tape travels in said first direction;
    a second head drum having a second pair of heads for recording and reproducing said information signals on a second set of consecutively scanned helical scan tracks on a bottom portion of said first side of the tape, said second set of helical scan tracks being arranged at said first predetermined angle from a second direction of travel of the tape opposite to said first direction when the tape travels in said second direction; and
    tape driving means for alternately moving the tape in said first direction and said second direction in dependence upon respective a first and a second mode of operation of the magnetic recording/reproducing apparatus.

6. The apparatus as claimed in claim 5, wherein said first head drum has an axis of rotation tilted from axes of rotation of a first reel disk and a second reel disk at a second predetermined angle, and said second head drum has an axis of rotation tilted from said axes of rotation of said first and second reel disks at a third predetermined angle.

7. The apparatus as claimed in claim 5; wherein said tape driving means comprises:
    a first capstan driven by a first capstan motor, said first capstan being in contact with the tape for moving the tape in said second direction;
    a first pinch roller for moving in contact with the tape during said second mode of operation to induce the tape to move in said second direction, and for moving away from the tape during said first mode of operation when the tape moves in said first direction;

first driving gear means rotated by said first capstan motor in a first and a second rotational direction in dependence upon respective said first and second modes of operation, for engaging said first reel disk during said second mode of operation and disengaging said first reel disk during said first mode of operation:

a second capstan driven by a second capstan motor, said second capstan being in contact with the tape, for moving the tape in said first direction;

a second pinch roller for moving in contact with the tape during said first mode of operation to induce the tape to move in said first direction, and for moving away from the tape during said second mode of operation when the tape moves in said second direction;

second driving gear means rotated by [a second belt connected to said second capstan motor in said first and said second rotational directions in dependence upon respective said first and second modes of operation, for engaging said second reel disk during said first mode of operation and disengaging said second reel disk during said second mode of operation; and a plurality of guide rollers for providing a path for the tape as the tape travels to one of said first and second reel disks.

8. The apparatus as claimed in claim 7, wherein said first driving gear means comprises:

a first driving gear rotated by a first belt connected to said first capstan motor;

a first idler gear engaged with said first driving gear and engaging said first reel disk when said first driving gear rotates in said second rotational direction and disengaging said first reel disk when said first driving gear rotates in said first rotational direction;

a first connection lever connecting said first driving gear and said first idler gear, and pivotally supporting said first idler gear about an axis of rotation of said first driving gear;

said second driving gear means comprises:

a second driving gear rotated by a second belt connected to said capstan motor;

a second idler gear engaged with said second driving gear and engaging said second reel disk when said second driving gear rotates in said first rotational direction and disengaging said second reel disk when said second driving gear rotates in said second rotational direction; and a second connection lever connecting said second driving gear and said second idler gear, and pivotally supporting said second idler gear about an axis of rotation of said second driving gear.

9. A magnetic recording/reproducing apparatus for recording and reproducing information signals on a tape, comprising:

a first head drum having a fixed axis of rotation, for accommodating the tape wound around a part of an outer periphery of said first head drum, and for recording and reproducing said information signals on and from a top portion of a first side of the tape during a first mode of operation when the tape moves in a first direction;

a second head drum having a fixed axis of rotation, for accommodating the tape wound around a part of an outer periphery of said second head drum, and for recording and reproducing said information signals on and from a bottom portion of said first side of the tape during a second mode of operation when the tape moves in a second direction opposite to said first direction;

a first capstan in contact with the tape, said first capstan being driven by a first capstan motor for moving the tape in said second direction;

a first pinch roller for moving in contact with the tape during said second mode of operation to induce the tape to move in said second direction, and for moving away from the tape during said first mode of operation when the tape moves in said first direction;

a first reel disk for storing the tape when the tape moves in said second direction, and for unwinding the tape when the tape moves in said first direction;

first driving gear means rotated by said first capstan motor, for engaging said first reel disk during said second mode of operation and disengaging said first reel disk during said first mode of operation;

a second capstan in contact with the tape, said second capstan being driven by a second capstan motor for moving the tape in said first direction;

a second pinch roller for moving in contact with the tape during said first mode of operation to induce the tape to move in said first direction, and for moving away from the tape during said second mode of operation when the tape moves in said second direction;

a second reel disk for storing the tape when the tape moves in said first direction, and for unwinding the tape when the tape travels in said second direction;

second driving gear means rotated by said second capstan motor, for engaging said second reel disk during said first mode of operation and disengaging said second reel disk during said second mode of operation; and a plurality of guide rollers for providing a path for the tape as the tape travels to one of said first and second reel disks.

10. The apparatus as claimed in claim 9, wherein:

said first head drum has a first pair of heads for reproducing and recording a first set of consecutively scanned helical scan tracks corresponding to said information signals on a top portion of the tape at a first predetermined angle from a first direction of travel of the tape when the tape travels in said first direction; and said second head drum has a second pair of heads for reproducing a second set of consecutively scanned helical scan tracks corresponding to said information signal on a bottom portion of the tape at said first predetermined angle from a second direction of travel of the tape opposite said first direction when the tape travels in said second direction.

11. The apparatus as claimed in claim 10, wherein said fixed axis of rotation of said first head drum is tilted from axes of rotation of said first and second reel disks at a second predetermined angle, and said fixed axis of rotation of said second head drum is tilted from said axes of rotation of said first and second reel disks at a third predetermined angle.

12. The apparatus as claimed in claim 11, wherein:

said first head drum is rotated in a first rotational direction during said second mode of operation; and said second head drum is rotated in a second rotational direction during said first mode of operation.

13. The apparatus as claimed in claim 9, wherein said fixed axis of rotation of said first head drum is tilted from axes of rotation of said first and second reel disks at a second predetermined angle, and said fixed axis of rotation of said second head drum is tilted from said axes of rotation of said first and second reel disks at a third predetermined angle.

14. The apparatus as claimed in claim 13, wherein an angle between said fixed axis of rotation of said first head drum and said fixed axis of rotation of said second head drum is twice each of said second and third predetermined angles.

15. The apparatus as claimed in claim 9, wherein:
said first driving gear means comprises:
 a first driving gear rotated by a first belt;
 a first idler gear engaged with said first driving gear and engaging said first reel disk when said first driving gear rotates in a second rotational direction and disengaging said first reel disk when said first driving gear rotates in a first rotational direction;
 a first connection lever connecting said first driving gear and said first idler gear, and pivotally supporting said first idler gear about an axis of rotation of said first driving gear;
said second driving gear means comprises:
 a second driving gear rotated by a second belt;
 a second idler gear engaged with said second driving gear and engaging said second reel disk when said second driving gear rotates in said first rotational direction and disengaging said second reel disk when said second driving gear rotates in said second rotational direction; and
 second connection lever connecting said second driving gear and said second idler gear, and pivotally supporting said second idler gear about an axis of rotation of said second driving gear.

16. The apparatus as claimed in claim 9, wherein:
said first head drum is rotated in a first rotational direction during said second mode of operation; and said second head drum is rotated in a second rotational direction during said first mode of operation.

17. A magnetic tape for use in a magnetic recording/reproducing apparatus having two head drums, said magnetic recording/reproducing apparatus being capable of recording and reproducing when the magnetic tape moves in one of a first direction and a second direction, said magnetic tape comprising:
 a first set of helical scan tracks located on a first region of a first side of the magnetic tape corresponding to said information signals, said first set of helical scan tracks to be read and recorded when the magnetic tape moves in said first direction past the first head drum;
 a second set of helical scan tracks located on a second region of said first side of the magnetic tape corresponding to said information signals, said second set of helical scan tracks to be read and recorded when the magnetic tape moves in said second direction past the second head drum.

18. A method of reproducing information signals from a magnetic tape, said method comprising:

moving a first pinch roller away from a first capstan driven by a first capstan motor during a first mode of operation to move the tape in a first direction;
rotating a first driving gear hooked to said first capstan motor and engaged with a first idler gear, to disengage first idler gear from a first reel disk, during said first mode;
moving a second pinch roller in contact with the tape adjacent to a second capstan driven by a second capstan motor during said first mode of operation;
rotating a second driving gear hooked to said second capstan motor and engaged with a second idler gear, to engage said second idler gear with a second reel disk, during said first mode of operation;
reproducing said information signals stored as helically scanned tracks from a top portion of a first side of the tape by a rotated first head drum during said first mode of operation;
moving said first pinch roller in contact with said first capstan driven by said first capstan motor during a second mode of operation to move the tape in a second direction;
rotating said first driving gear hooked to said first capstan motor and engaged with said first idler gear, to engage said first idler gear with said first reel disk, during said second mode;
moving said second pinch roller away from the tape adjacent to said second capstan driven by said second capstan motor during said second mode of operation;
rotating said second driving gear hooked to said second capstan motor and engaged with said second idler gear, to disengage said second idler gear from said second reel disk, during said second mode of operation; and
reproducing said information signals stored as helically scanned tracks from a bottom portion of said first side of the tape by a rotated second head drum during said second mode of operation.

19. A method of recording information signals from a magnetic tape, said method comprising:
moving a first pinch roller away from a first capstan driven by a first capstan motor during a first mode of operation to move the tape in a first direction;
rotating a first driving gear hooked to said first capstan motor and engaged with a first idler gear, to disengage first idler gear from a first reel disk, during said first mode:
moving a second pinch roller in contact with the tape adjacent to a second capstan driven by a second capstan motor during said first mode of operation;
rotating a second driving gear hooked to said second capstan motor and engaged with a second idler gear, to engage said second idler gear with a second reel disk, during said first mode of operation;
recording said information signals stored as helically scanned tracks on a top portion of a first side of the tape by a rotated first head drum during said first mode of operation;
moving said first pinch roller in contact with said first capstan driven by said first capstan motor during a second mode of operation to move the tape in a second direction;
rotating said first driving gear hooked to said first capstan motor and engaged with said first idler gear, to engage said first idler gear with said first reel disk, during said second mode;

moving said second pinch roller away from the tape adjacent to said second capstan driven by said second capstan motor during said second mode of operation;

rotating said second driving gear hooked to said second capstan motor and engaged with said second idler gear, to disengage said second idler gear from said second reel disk, during said second mode of operation; and recording said information signals stored as helically scanned tracks on a bottom portion of said first side of the tape by a rotated second head drum during said second mode of operation.

20. A magnetic recording/reproducing apparatus, comprising:

a first head drum oriented to rotate around a corresponding first axis of rotation, for recording and reproducing information on a first set of consecutively arranged helical scan tracks corresponding to information signals on an upper domain of one side of a tape while the tape is running in a first direction defining a first oblique angle with said first axis; and a second head drum oriented to rotate around a corresponding second axis of rotation defining a second oblique angle with said first axis, for recording and reproducing information on a second set of consecutively arranged helical scan tracks corresponding to said information signals on a lower domain of said one side of the tape while the tape is running in a second direction opposite to said first direction and defining a third oblique angle with said second axis.

21. The magnetic recording/reproducing apparatus as defined in claim 20, wherein said first and second head drums are mounted in mutually opposing directions with said first oblique angle being substantially equal to said third oblique angle.

22. The magnetic recording/reproducing apparatus as defined in claim 20, wherein said first head drum comprises a first pair of heads for recording and reproducing information on said upper domain of said one side of the tape while the tape is running in said first direction.

23. The magnetic recording/reproducing apparatus as defined by claim 22, further comprised of said second dram comprising a second pair of heads for recording and reproducing information on said lower domain of said one side of the tape while the tape is running in said second direction.

24. The magnetic recording/reproducing apparatus as defined in claim 20, wherein said second head dram comprises a second pair of heads for recording and reproducing information on said lower domain of said one side of the tape while the tape is running in said second direction.

25. The apparatus of claim 20, comprising:

said first head drum providing a first exterior circumferential surface engaging said one side of the tape over an arc extending more than 180° around said first exterior circumferential surface while the tape is traveling in said first direction; and said second head drum providing a second exterior circumferential surface engaging said one side of the tape over an arc extending more than 180° around said second exterior circumferential surface while the tape is traveling in said second direction.

26. The apparatus of claim 20, comprising:

said first head drum providing a first exterior circumferential surface engaging the a tape over an arc extending more than 180° around said first exterior circumferential surface while the tape is traveling in said first direction and while the tape is traveling in said second direction:, and said second head drum providing a second exterior circumferential surface engaging said one side of the tape over an arc extending more than 180° around said second exterior circumferential surface while the tape is traveling in said first direction and while the tape is traveling in said second direction.

27. The apparatus of claim 20, comprising:

means for guiding the tape onto said first head drum and said second head drum;

said first head drum providing a first exterior circumferential surface with said guiding means wrapping the tape partially around said first exterior circumferential surface while said one side of the tape engages said first exterior circumferential surface over an arc extending more that 180° around said first exterior circumferential surface when the tape is traveling in said first direction; and said second head drum providing a second exterior circumferential surface with said guiding means wrapping the tape partially around said second exterior circumferential surface while said one side of the tape engages said second exterior circumferential surface over an arc extending more that 180° around said second circumferential surface when the tape is traveling in said second direction.

28. The apparatus of claim 20, comprising:

means for guiding the tape onto said first head drum and said second head drum;

said first head drum providing a first exterior circumferential surface with said guiding means wrapping the tape partially around said first exterior circumferential surface while said one side of the tape engages said first exterior circumferential surface over an arc extending more that 180° around said first exterior circumferential surface when the tape is traveling in said first direction and when the tape is traveling in said second direction; and said second head drum providing a second exterior circumferential surface with said guiding means wrapping the tape partially around said second exterior circumferential surface while said one side of the tape engages said second exterior circumferential surface over and arc extending more that 180° around said second exterior circumferential surface when the tape is traveling in said first direction and when the tape is traveling in said second direction.

* * * * *

UNITED STATES PATENT AND TRADEMARK OFFICE
CERTIFICATE OF CORRECTION

PATENT NO. : 5,377,059
DATED : Dec. 27, 1994
INVENTOR(S) : Min-Su Lee

It is certified that error appears in the above-indentified patent and that said Letters Patent is hereby corrected as shown below:

Claim 7 Column 7 Line 21-22, delete "[a second belt connected to";

Claim 23 Column 11 Line 48, change "dram" to --drum--;

Claim 24 Column 11 Line 54 change "dram" to --drum--:

Signed and Sealed this

Twenty-second Day of April, 1997

Attest:

BRUCE LEHMAN

Attesting Officer

*Commissioner of Patents and Trademarks*